(12) United States Patent
Kaiser

(10) Patent No.: US 11,427,714 B2
(45) Date of Patent: Aug. 30, 2022

(54) ANTIFOULING COATING AND DEVICE FOR A CONDENSATE DRAIN PIPE AND ASSOCIATED METHODS

(71) Applicant: Innovative HVAC Products LLC, West Palm Beach, FL (US)

(72) Inventor: Stewart Kaiser, Palm Beach Gardens, FL (US)

(73) Assignee: Innovative HVAC Products LLC, West Palm Beach, FL (US)

( * ) Notice: Subject to any disclaimer, the term of this patent is extended or adjusted under 35 U.S.C. 154(b) by 0 days.

(21) Appl. No.: 17/344,402

(22) Filed: Jun. 10, 2021

(65) Prior Publication Data

US 2022/0135809 A1 May 5, 2022

Related U.S. Application Data

(60) Provisional application No. 63/205,258, filed on Nov. 30, 2020, provisional application No. 63/204,910, filed on Nov. 2, 2020.

(51) Int. Cl.
C09D 5/16 (2006.01)
C09D 1/00 (2006.01)
C09D 5/03 (2006.01)

(52) U.S. Cl.
CPC ............ *C09D 5/1693* (2013.01); *C09D 1/00* (2013.01); *C09D 5/03* (2013.01); *C09D 5/1606* (2013.01)

(58) Field of Classification Search
CPC ........ C09D 5/1693; C09D 1/00; B08B 9/032; A01N 55/06
See application file for complete search history.

(56) References Cited

U.S. PATENT DOCUMENTS 2,044,772 A * 6/1936 Conn ................ H01B 3/441
428/389
2010/0279000 A1 11/2010 Sambasivan et al.
(Continued)

OTHER PUBLICATIONS

Enab et al, Inducing Antibacterial Activity of Commercial PET Surgical Sutures via Silver Nanoparticles, 2014, International Conference on Chemistry Biomedical and Environment Engineering, pp. 70-73 (Year: 2014).*

(Continued)

*Primary Examiner* — Dah-Wei D. Yuan
*Assistant Examiner* — Andrew J Bowman
(74) *Attorney, Agent, or Firm* — Allen, Dyer, Doppelt & Gilchrist, P.A.

(57) ABSTRACT

A method for the prevention of zooglea growth within an air conditioning system includes applying an antifouling coating to an interior of a condensate pipe of the air conditioning system, where the antifouling coating has a base layer of an algaecide, an intermediate layer of a hydrophobic polymer, and a top layer of a metallic powder. The method of applying the antifouling coating includes pouring the algaecide coating into the condensate pipe, spinning the condensate pipe, and drying the algaecide coating. The method also includes pouring the hydrophobic polymer into the condensate pipe, spinning the condensate pipe to apply the hydrophobic polymer over the algaecide coating, partially drying the hydrophobic polymer, and pouring the metallic powder into the condensate pipe. In addition, the method includes spinning the condensate pipe to apply the metallic powder over the hydrophobic polymer, and drying the hydrophobic polymer until the metallic powder is embedded.

10 Claims, 4 Drawing Sheets

(56) References Cited

U.S. PATENT DOCUMENTS

2015/0101358 A1* 4/2015 Kaiser .................... F25B 47/00
   62/157
2015/0175249 A1 6/2015 Funke, Jr.
2018/0355189 A1 12/2018 Huang et al.

OTHER PUBLICATIONS

Arendsen et al, The Use of Copper as an Antimicrobial Agent in Health Care Including Obstetrics and Gynecology, Clinical Microbiology Reviews, Oct. 2019, vol. 32 Issue 24, pp. 1-28 (Year: 2019).*
PCT International Search Report and Written Opinion; PCT/US2021/057704; USPTO Searching Authority; dated Feb. 2, 2022; entire document.

* cited by examiner

ANTIFOULING COATING AND DEVICE FOR A CONDENSATE DRAIN PIPE AND ASSOCIATED METHODS

RELATED APPLICATIONS

This application claims the benefit of U.S. Provisional Applications No. 63/204,910 filed Nov. 2, 2020 and No. 63/205,258, filed Nov. 30,2020, which are hereby incorporated herein in their entirety by reference.

FIELD OF THE INVENTION

The present invention relates to heating and cooling systems, and more particularly, to an antifouling coating and device for a condensate drain pipe and associated methods.

BACKGROUND OF THE INVENTION

The heating, air conditioning and refrigeration industry is well-established with known methods and techniques in which the refrigeration process is used to heat and cool structures and keep items cool or frozen. Typical equipment that implements the refrigeration process includes a cold or evaporative side. This side is used to absorb heat from the surrounding air, water or materials and transfer the heat to another location and released. This process of absorbing heat through the refrigeration process is a well-known and established practice and used in air conditioning a home.

For example, air is passed through or over an evaporative surface of an air handler that is much colder than the incoming air temperature during an air conditioning cycle for a home. This results in condensation and causes the air holding the moisture to release water droplets on to the colder evaporative surface or coils. The condensation that occurs during the air conditioning cycle dehumidifies the air and is a main feature of air conditioning.

The water from the condensation is collected and flows from the colder surface and drips into a collection drain pan at the bottom of the air handler. A drain pipe is connected to the drain pan that typically discharges outside of the home or directly into a drain line. However, the flow of the water from the drain pan and through the drain pipe is at a relatively slow velocity and can also pool inside the drain pipe. This stagnant water can result in a jelly like bacteria beginning to form known as zooglea.

Zooglea is a gelatinous or mucilaginous mass that is characteristic of the growth of various bacteria when growing in fluid media rich in organic material and is made up of the bodies of the bacteria embedded in a matrix of swollen confluent capsule substance. This jelly like bacterial growth grows within the drain pipe and slows the flow through the pipe and can eventually stop the water flow completely. This blockage causes the water to back up in the drain pan and overflow onto the floor, walls, or ceilings of the structure. This drainage and flooding problem with air handlers is well documented and is the cause for more water damage than any other source.

The industry has attempted to address this problem with the drain pipe in many ways. For example, a float switch can be installed in the drain pan of the air handler, which turns the system off once the water rises to a certain level inside the drain pan. However, this method has proven to be unreliable due to the switch being stuck or to otherwise malfunction so that the system is not turned off. Also, when the water rises near the point where the float switch is configured to turn off the system, the float switch may cause damage to the equipment as the float bounces up and down with the level of the water causing the compressor to start and stop every few minutes. In addition, while a float switch may prevent flooding, it still leaves the owner with a system that is not operating properly. Often this happens in the warmest conditions when the system is running almost continuously and requires a service technician to clear the drain pipe, which can be an expensive service call.

Other attempts to prevent the drain pipe from becoming blocked include placing anti-bacterial chemical tablets into the drain pan. However, introducing chemicals into the air conditioning system of a home is not ideal. In addition, the tablets often are ineffective within days or weeks of dissolving into the water and do not reliably stop the zooglea growth. Still other attempts include pouring bleach and chemicals directly through the drain pipe or into the drain pan, which causes odors in the home and does not reliably prevent zooglea growth.

Accordingly, there is a need for an improved method and system to prevent or diminish the growth of zooglea in existing drain pans and drain pipes of air conditioning systems that is safe and effective.

SUMMARY OF THE INVENTION

A method for the prevention of zooglea growth within an air conditioning system is disclosed. The method includes applying an antifouling coating to an interior of a condensate pipe of the air conditioning system, where the antifouling coating comprises a base layer of an algaecide, an intermediate layer of a hydrophobic polymer, and a top layer of a metallic powder. The metallic powder may be a mixture of silver and copper, and the hydrophobic polymer may be polytetrafluoroethylene (PTFE). The method may also include applying the antifouling coating to a drainage pan of the air conditioning system.

In addition, the applying of the antifouling coating to the condensate pipe includes pouring the algaecide coating into the condensate pipe, spinning the condensate pipe to apply the algaecide coating to an interior surface of the condensate pipe, and drying the algaecide coating. The method also includes pouring the hydrophobic polymer into the condensate pipe, spinning the condensate pipe to apply the hydrophobic polymer over the algaecide coating, partially drying the hydrophobic polymer, and pouring the metallic powder into the condensate pipe. In addition, the method includes spinning the condensate pipe to apply the metallic powder over the hydrophobic polymer, and drying the hydrophobic polymer until the metallic powder is embedded.

In another aspect, a method for the prevention of zooglea growth within an air conditioning system includes applying an antifouling coating to cordage having a first end and a second end, where the antifouling coating comprises a base layer of an algaecide, and a top layer of metallic powder. The method includes inserting the cordage through a condensate pipe of the air conditioning system. In addition, the method includes inserting a first end of the cordage through a copper sleeve, and securing the first end of the cordage inside the copper sleeve, where an exterior of the copper sleeve extends partially from the condensate pipe in order to anchor the first end of the cordage to an open end of the condensate pipe. The copper sleeve may comprise a mesh.

In another particular aspect, an antifouling coating for the prevention of zooglea growth within an air conditioning system is disclosed. The antifouling coating includes a base layer comprising an algaecide, an intermediate layer comprising a hydrophobic polymer, and a top layer comprising metallic powder.

In yet another aspect, a device for the prevention of zooglea growth within an air conditioning system is disclosed and includes cordage having a first end and a second end, and an antifouling coating applied to the cordage. The antifouling coating comprises a base layer of an algaecide, and a top layer of metallic powder. The device also includes a copper sleeve secured to the first end of the cordage, where the copper sleeve may comprise a mesh. The cordage may comprise a natural fiber material or a synthetic fiber material, or a combination of both.

DETAILED DESCRIPTION OF PREFERRED EMBODIMENTS

Figure 1:
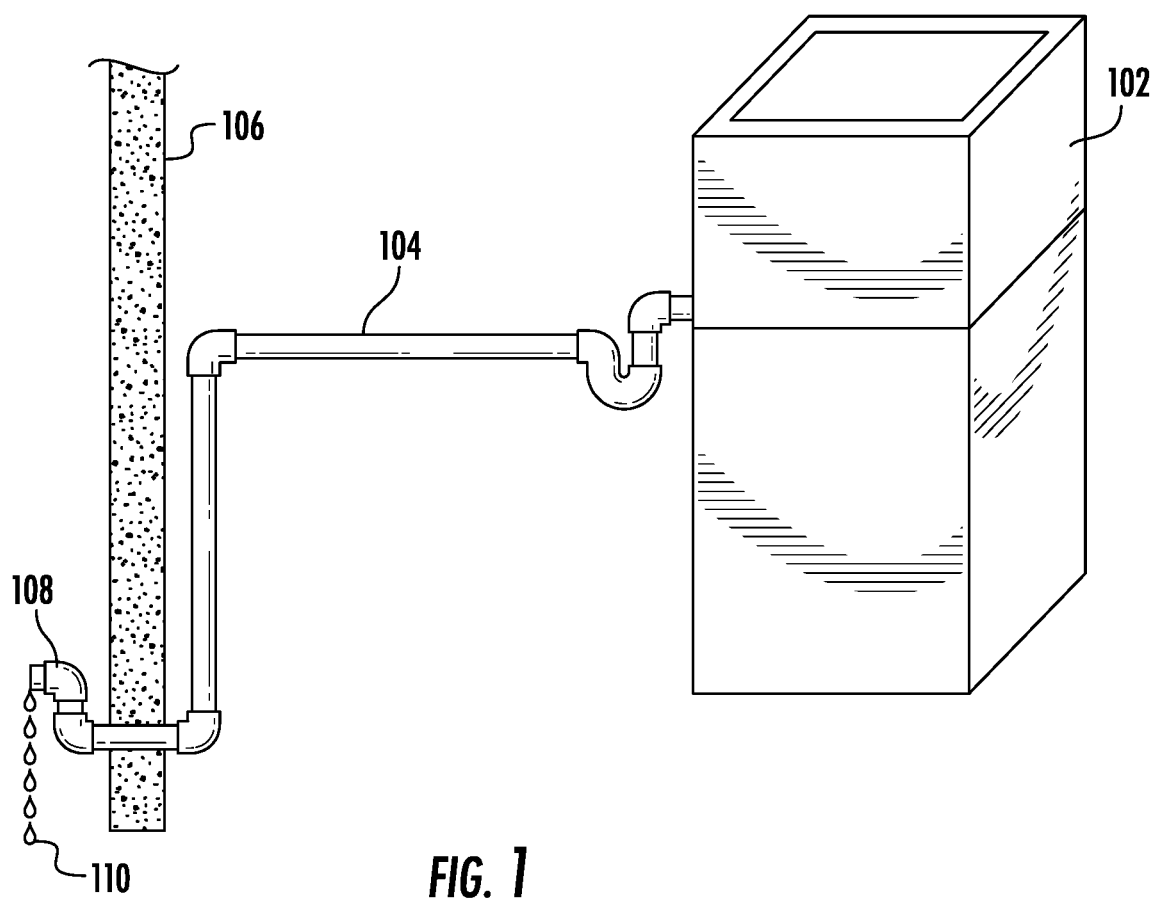
FIG. 1 is a schematic of an air conditioning system and condensate drain pipe in which various aspects of the disclosure may be implemented.

In the summary of the invention, provided above, and in the descriptions of certain preferred embodiments of the invention, reference is made to particular features of the invention, for example, method steps. It is to be understood that the disclosure of the invention in this specification includes all possible combinations of such particular features, regardless of whether a combination is explicitly described. For instance, where a particular feature is disclosed in the context of a particular aspect or embodiment of the invention, that feature can also be used, to the extent possible, in combination with and/or in the context of other particular aspects and embodiments of the invention, and in the invention generally.

An object of the present invention is to provide a drainage pipe and fittings that are permanently treated with a specially formulated coating which by way of its own unique properties, permanently prevents the growth of zooglea within the drainage system. The coating is comprised of a hydrophobic polymer such as polytetrafluoroethylene (PTFE) which causes extremely low tension between the walls of the pipe and the drain water. This beading effect causes the molecules of the water to bead together and way from the pipe surface. Another object of the coating is to include anti-fouling, anti-microbial and anti-viral substances within the coating which helps prevent growth in the standing water. Some of the most significant properties of the coating is infused copper and silver particles and powder. The unique properties have a physical effect on the zooglea before it can grow to a gelatinous state. Silver ions perform their deadly work by punching holes in bacterial membranes and wreaking havoc once inside. In addition, they bind to essential cell components like DNA, preventing the bacteria from performing even their most basic functions. Accordingly, copper alloy having silver has a significant effect on the growth of bacteria, molds, fungi, spores, viruses, prokaryotic and eukaryotic microorganisms. This overall method is known as the oligodynamic effect.

The coating of the present invention, when used in new drainage systems will provide a lifetime of protection from the growth of zooglea among many other bacterial and viral growths which would be deemed unhealthy and potentially dangerous to humans including but not limited to pathogens like legionary's disease. The standing water inside a drainage system acts similar to an incubator for almost every form of unwanted growth.

The coated piping can be used with conventional PVC piping and alleviates concerns from future clogs and water damage. In many cases, old piping can be easily replaced with the new treated and coated piping to prevent future clogs and water damage on older systems.

An important aspect of the invention is the process in which the coatings, treatments and infusions of the topical metallic powder coats are applied during the manufacturing process. For example, initially the drain pipe, preferably PVC, may be roughened with a steel wool circular brush in the internal section of the pipe. A stopper is placed on each end of the pipe and a tube placed through the stopper. The first layer of the antifouling coating (e.g. algaecide) is poured down into the pipe through the tube. Once filled, the pipe is spun to force the algaecide against the rough walls of the pipe using centrifugal force. After several minutes, the remaining algaecide that does not adhere to the walls of the pipe is drained. The drain pipe is placed in a drying chamber or high temperature low humidity oven for several minutes.

The second layer of the antifouling coating of a hydrophobic polymer (e.g. PTFE) is poured into the drain pipe. Again, the pipe is spun at high velocity for several minutes, forcing the second layer to embed into the underlying first layer. Once again, the remaining hydrophobic polymer is drained from the pipe. The pipe is placed back into the drying chamber.

Once the second layer of the hydrophobic polymer becomes tacky and partially dried, the pipe is removed from the drying chamber. The pipe is placed vertically and the top stopper is removed. A fifty percent mixture of silver powder and copper powder may be poured into the pipe until filled. Once again, the stopper is placed back on the pipe. The pipe is again, spun at high velocity causing the powder mixture to imbed itself as a topical into the underlying second layer or tackifier coating. After several minutes, the remaining powder mixture is poured out of the pipe. The stoppers are placed back on the pipe and the pipe is placed back into the drying chamber for several hours or until sufficiently dried. The pipe is the taken out and placed on a shaker. The stopper removed and the pipe is shaken abruptly for several minutes until all the powder residue that is not adhered to the pipe is shaken away. The pipe is now ready for use.

An objective of the invention to provide a coating, a method of applying the coating to piping and related fittings, and a method of using the coated piping in the heating, ventilating and air conditioning (HVAC) field amongst any other industries which could benefit from such an invention.

The antifouling coating may be comprised of a mixture of chemicals in various percentages so that the percentages provided herein are exemplary rather than limiting. As described above, the antifouling coating includes a hydrophobic polymer (e.g. PTFE) based coating capable of adhering to construction and piping materials such as plastics, PVC and metals. An intermediate second layer of an antifungal chemical coating, an anti-bacterial chemical coating, and/or an anti-viral chemical coating is applied over the hydrophobic polymer. These two layers in various percentages form the base for the coating mixture. In addition, a metallic powder of copper and/or silver is added to the coating in various relative percentages. As those of ordinary skill in the art can appreciate, many metallic and anti-microbial substances can be used. Furthermore, though certain viscous and anti-microbial coatings have been described, any chemical which demonstrates those properties may be used in any percentage or combination with the antifouling coating of the present invention.

In another particular aspect, the antifouling coating can be applied to cordage (e.g. rope). The cordage can be installed in an existing drain pipe from the drain pan to the outlet of the drain pipe in order to prevent the growth of any microbial and more defined zooglea. The cordage is left inside the drain pipe and can be removed once the antifouling coating has deteriorated. In addition, a copper sleeve can be used to secure one end of the cordage to the drain pan of the air conditioning system, and which also helps to prevent the growth of microbial or more defined zooglea in the inlets and outlets of the drainage system.

Referring now to FIG. 1, a schematic of a typical air conditioning system 102 and condensate drain pipe 104 is shown. The condensate water drains from the air conditioner 102, through the drain pipe 104, and the condensate water 110 flows out of the outlet 108 located outside of a wall 106 of a home.

Figure 2:
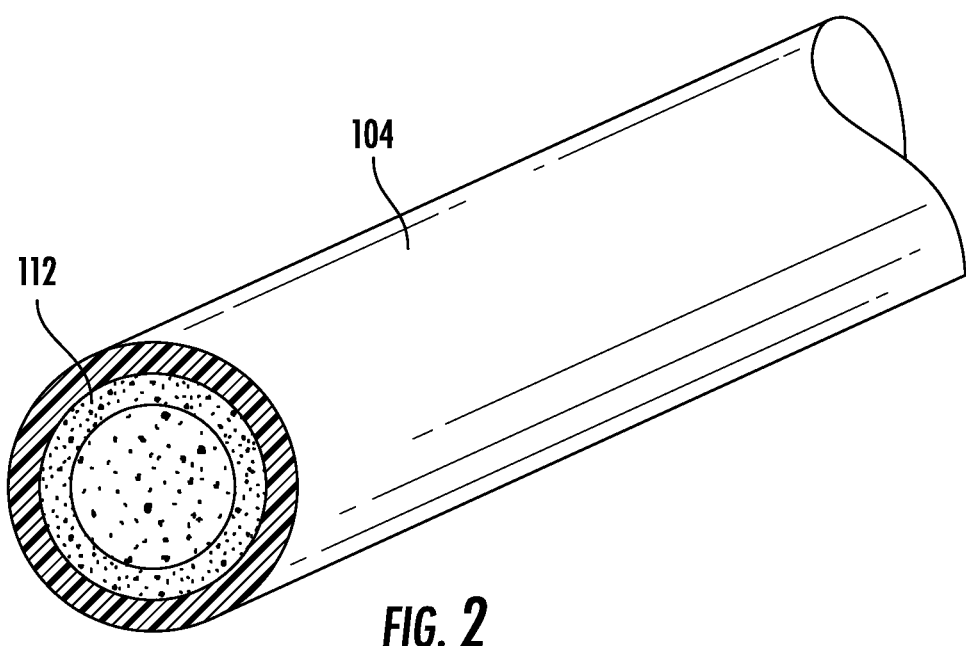
FIG. 2 is a schematic of a portion of the drain pipe having an antifouling coating of the invention.
Figure 3:
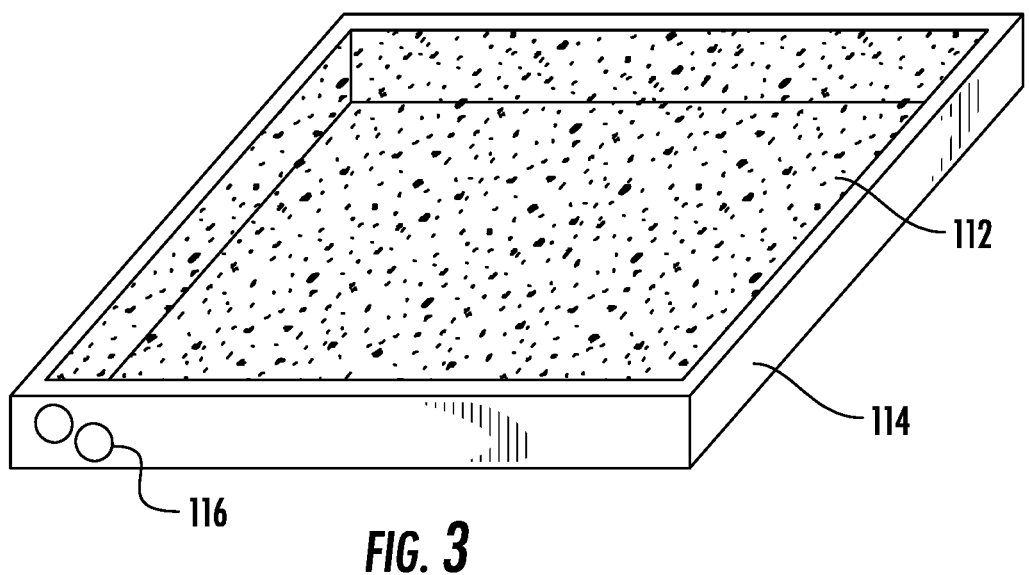
FIG. 3 is a schematic of a drain pan of the air conditioning system of FIG. 1 having the antifouling coating.

FIG. 2 is a schematic of a portion of the drain pipe 104 having an antifouling coating 112 of the invention applied to the interior walls of the drain pipe 104. FIG. 3 is a schematic of a drain pan 114 of the air conditioning system having the antifouling coating 112 applied to its surface. The antifouling coating 112 can also be applied to various fittings wherever the condensate water 110 may reach.

Figure 4:
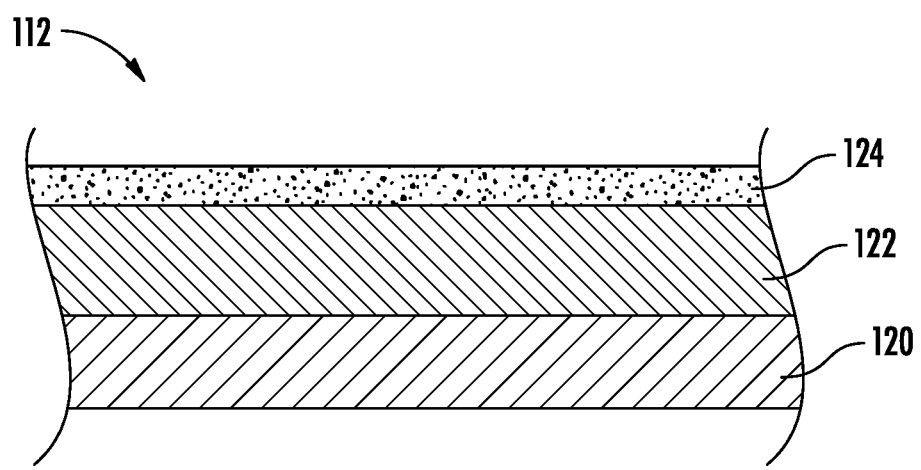
FIG. 4 is a cross section of the antifouling coating.

As explained above, the antifouling coating 112 includes three layers as shown in FIG. 4. The base layer 120 of algaecide is the first layer to be applied to a surface. The intermediate layer is the hydrophobic polymer 122 that is applied over the base layer 120. The top layer 124 is a metallic powder that can be partially embedded within the intermediate layer 124.

Figure 5:
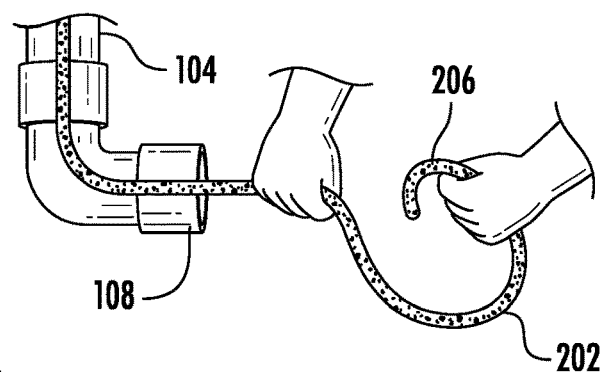
FIG. 5 is a schematic of cordage having the antifouling coating and being pulled through the drain pipe.
Figure 6:
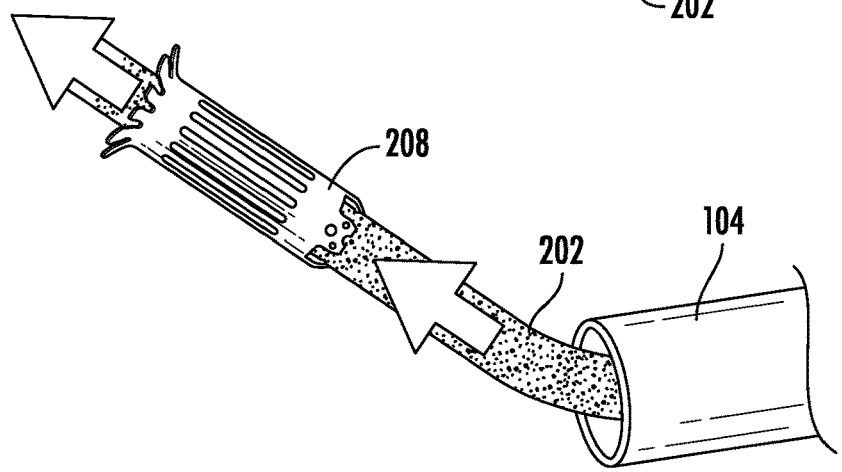
FIG. 6 is a schematic of a first end of the cordage being pulled through a sleeve of the present invention.
Figure 7:
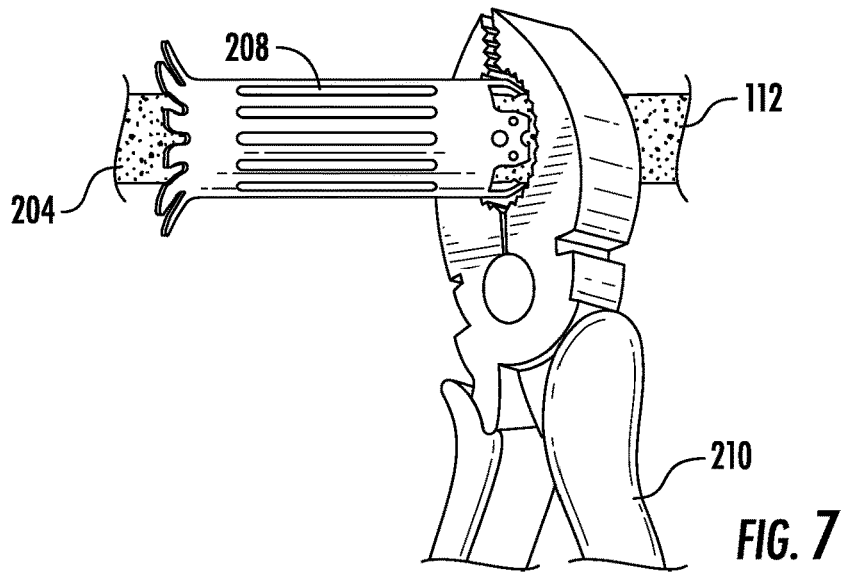
FIG. 7 is a schematic of the sleeve being secured to the cordage.
Figure 8:
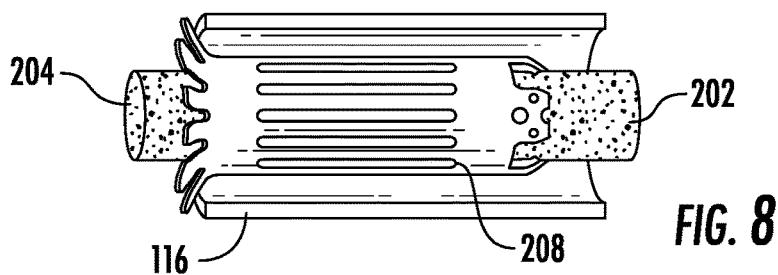
FIG. 8 is a schematic of the sleeve secured to an outlet of the drain pan.

Referring now to FIG. 5, a schematic of cordage 202 having the antifouling coating 112 is shown and being pulled through the drain pipe 104 with the second end 206 extending out from the outlet 108 of the drain pipe 104. The first end 204 of the cordage 202 is pushed or pulled through the sleeve 209. Once the sleeve 208 is in the proper position, the sleeve 208 is secured to the first end 204 of the cordage 202 as shown in FIG. 7 using a crimping tool 210. The opposing end of the sleeve 208 is secured to the open end of the drain pan outlet 116 as shown in FIG. 8.

Figure 9:
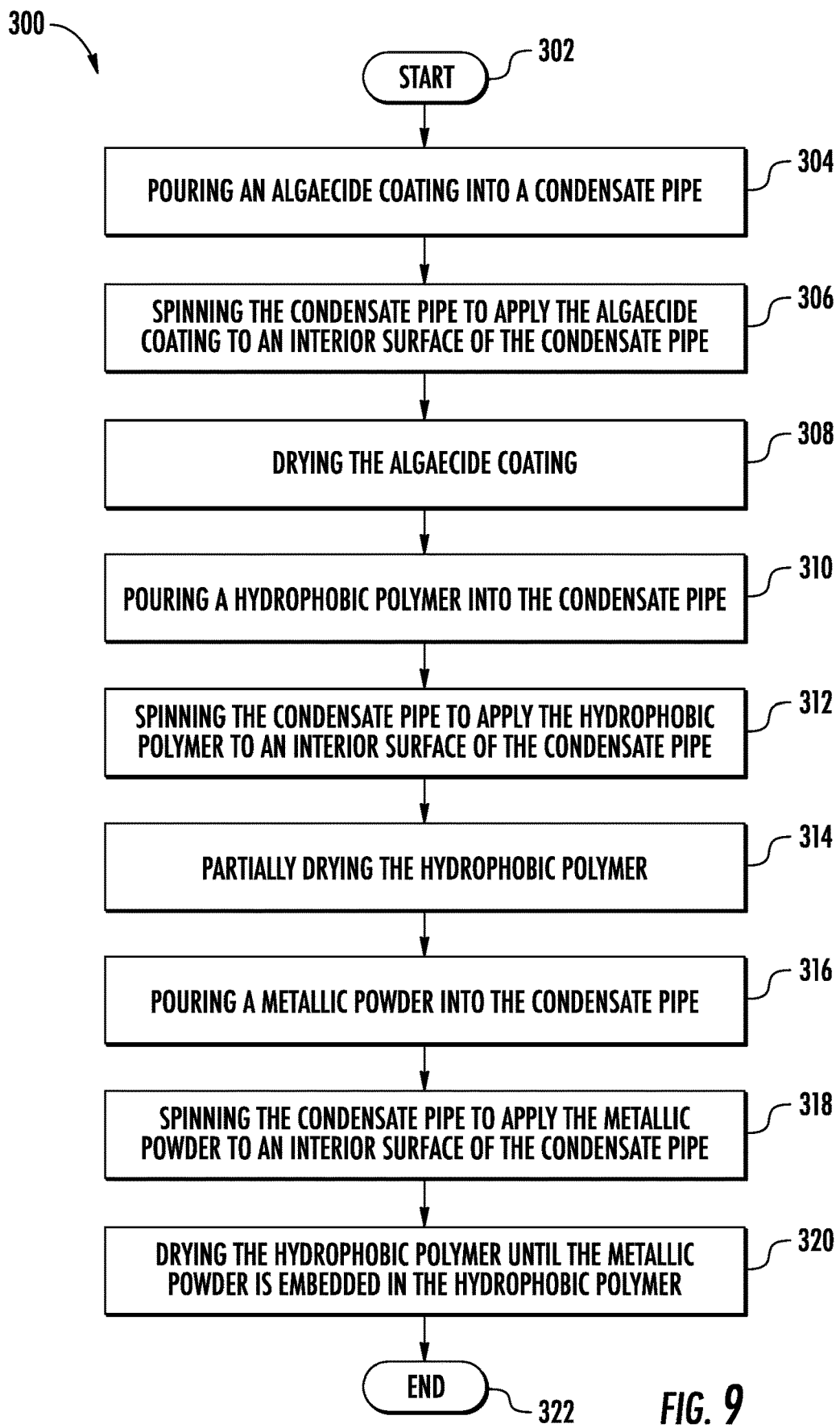
FIG. 9 is a flowchart of a method of applying the antifouling coating to the drain pipe.

Referring now to FIG. 9, a flowchart of a method of applying the antifouling coating to the drain pipe is depicted. The method 300 begins at 302 with pouring the algaecide coating into the condensate pipe, at 304. The method includes, at 306, spinning the condensate pipe to apply the algaecide coating to an interior surface of the condensate pipe, and drying the algaecide coating, at 308. The method also includes, at 310, pouring the hydrophobic polymer into the condensate pipe, spinning the condensate pipe, at 312, to apply the hydrophobic polymer over the algaecide coating, and partially drying the hydrophobic polymer, at 314. Moving to 316, the method includes pouring the metallic powder into the condensate pipe, spinning the condensate pipe, at 318, to apply the metallic powder over the hydrophobic polymer, and drying the hydrophobic polymer until the metallic powder is embedded in the hydrophobic polymer.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. A method for the prevention of zooglea growth within an air conditioning system, the method comprising:
   applying an antifouling coating to cordage having a first end and a second end, wherein the antifouling coating comprises a base layer of an algaecide, and a top layer of metallic powder; and
   inserting the cordage through a condensate pipe of the air conditioning system.

2. The method of claim 1, wherein the metallic powder comprises a mixture of silver and copper.

3. A method for the prevention of zooglea growth within an air conditioning system, the method comprising:
   applying an antifouling coating to cordage having a first end and a second end, wherein the antifouling coating comprises a base layer of an algaecide, and a top layer of metallic powder; and
   inserting a first end of the cordage through a copper sleeve, and securing the first end of the cordage inside the copper sleeve, wherein an exterior of the copper sleeve extends partially from the condensate pipe in order to anchor the first end of the cordage to an open end of the condensate pipe.

4. The method of claim 3, wherein the copper sleeve comprises a mesh.

5. A method for the prevention of microbial fouling within an air conditioning system, the method comprising:
   inserting cordage through a condensate pipe of the air conditioning system, the cordage having an antifouling coating for inhibiting microbial growth; and
   securing a first end of the cordage within the air conditioning system wherein securing the first end of the cordage within the air conditioning system includes inserting the first end of the cordage through a sleeve, securing the first end of the cordage inside the sleeve, and securing the sleeve within the air conditioning system.

6. The method of claim 5, wherein the antifouling coating includes a polymer mixed with silver and copper powder.

7. The method of claim 5, wherein the sleeve is copper.

8. The method of claim 7, wherein securing the copper sleeve within the air conditioning system includes at least partially extending an exterior of the copper sleeve from the condensate pipe in order to anchor the first end of the cordage to an open end of the condensate pipe.

9. The method of claim 7, wherein the copper sleeve comprises a mesh.

10. The method of claim 5, wherein the antifouling coating inhibits zooglea growth.

* * * * *